United States Patent
Anderson et al.

[15] 3,679,050
[45] July 25, 1972

[54] CONVEYOR STRUCTURE

[72] Inventors: William S. Anderson, Braham, Minn. 55006; Foster L. Bucher, 222 N. Cypress Street, Cambridge, Minn. 55008

[22] Filed: June 25, 1971

[21] Appl. No.: 157,000

Related U.S. Application Data

[63] Continuation of Ser. No. 1,384, Jan. 8, 1970, abandoned.

[52] U.S. Cl.................................209/84, 171/126, 198/197
[51] Int. Cl.......................................B07b 13/04, B65g 15/30
[58] Field of Search..........198/184, 189, 193, 195, 197–198; 171/126, 130; 209/84

[56] References Cited

FOREIGN PATENTS OR APPLICATIONS

964,464  8/1950  France..................................198/195

*Primary Examiner*—Edward A. Sroka
*Attorney*—Reif and Gregory

[57] ABSTRACT

A cross-link conveyor as in connection with a potato harvester wherein each link thereof has upstanding resilient fingers spaced therealong and molded integral therewith, the fingers of successive of said links being in staggered relation with respect to one another and said fingers being spaced apart such that two or more adjacent of said fingers receive and retain therebetween potatoes as distributed onto said conveyor for travel by said conveyor

5 Claims, 5 Drawing Figures

Patented July 25, 1972
3,679,050
2 Sheets-Sheet 1
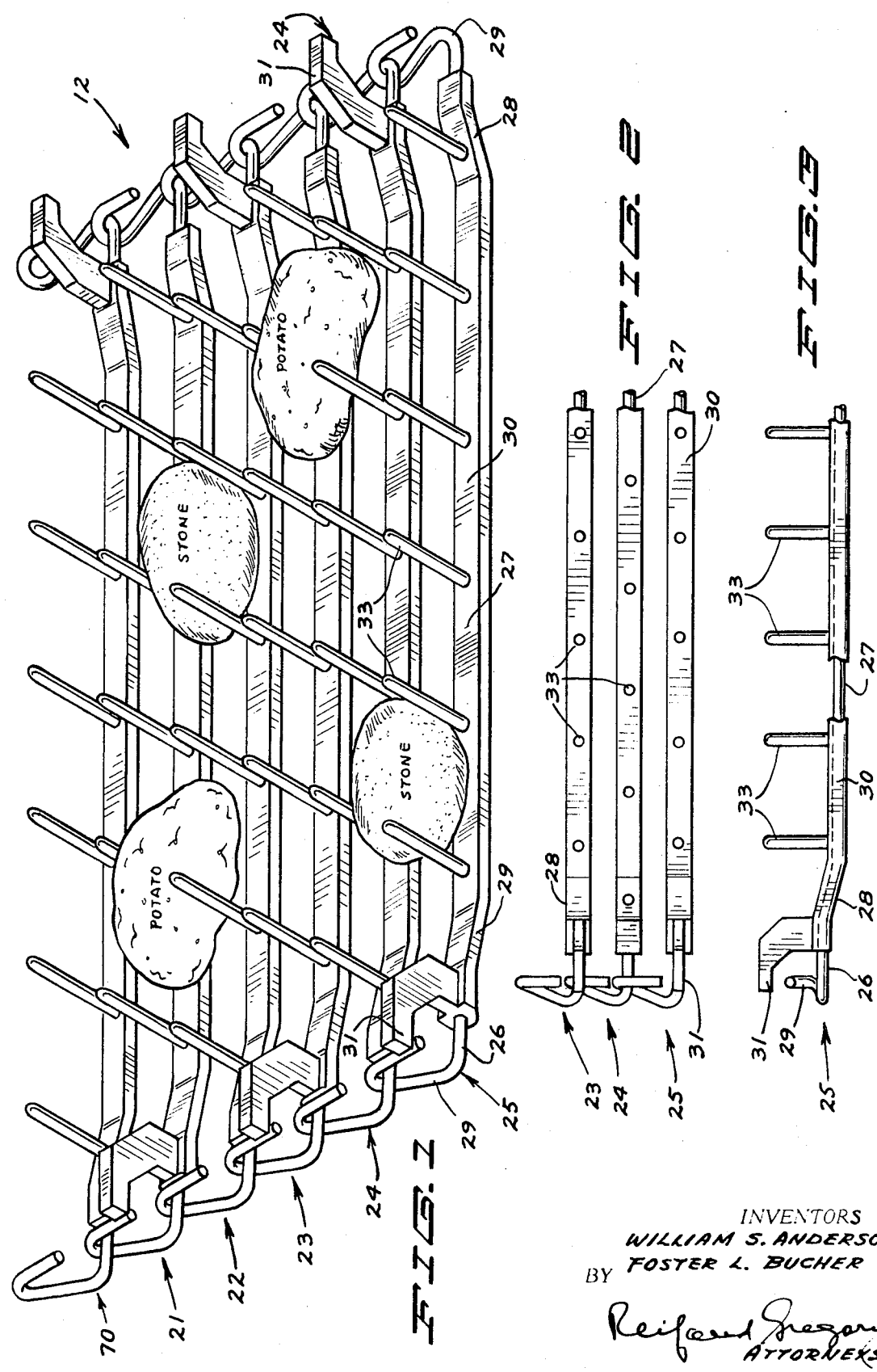
INVENTORS
WILLIAM S. ANDERSON
FOSTER L. BUCHER
BY
Reifsnil Gregory
ATTORNEYS Patented July 25, 1972

INVENTOR.
WILLIAM S. ANDERSON
FOSTER L. BUCHER
BY
ATTORNEYS

CONVEYOR STRUCTURE

This application is a continuation of Ser. No. 1,384 filed Jan. 8, 1970, now abandoned.

SUMMARY AND BACKGROUND OF THE INVENTION

This invention relates to an apron or conveyor to carry a root crop and more particularly to carry a crop such as potatoes in connection with a potato harvester.

Conveyors commonly embody the use of flights thereon which flights are longitudinally spaced transverse stop members. With the use of flights, the crop carried by the conveyor tends to gather against the flight with upward and downward movement of the conveyor and as a result the crop is unloaded or discharged from the conveyor in a bunched up condition.

It is desirable to carry a root crop on a conveyor in the same condition of distribution in which the crop is loaded onto the conveyor. Present in the prior art are conveyors embodying the use of fingers. Representative of such conveyors are the disclosures in the U.S. Pat. Nos. 1,182,144; 2,633,685; 2,643,754; 2,843,264; and 2,769,539. The U.S. Pat. No. '144 discloses long fingers mounted radially about the hub and in effect, forming a wheel to grip potatoes and transfer them as from one conveyor to another. The U.S. Pat. No. '685 shows the use of short, nubby rubber fingers for the purpose of cleaning a potato by having said potatoes roll over the fingers. The U.S. Pat. No. '754 shows the use of rubber fingers projecting from a solid conveyor or belt to move or nudge a crop along the ground to a pick-up conveyor. The U.S. Pat. No. '539 shows the use of rubber fingers projecting from a solid conveyor or belt which fingers are sufficiently close together and are of such stiffness as to form a surface to support potatoes thereon for the purpose of having the potatoes roll over the ends of the fingers onto another conveyor. The fingers here are of such stiffness that only objects such as stones would be lodged between adjacent fingers to be carried by the conveyor to be discharged at the end thereof as onto the ground.

The invention herein is distinguishable from the reference material cited. The structure disclosed herein embodies a conveyor comprised of interengaged longitudinally spaced cross links with each link having spaced therealong molded fingers integral therewith and upstanding therefrom, successive of said links have said fingers arranged thereon to be in staggered relation with respect to one another to yieldingly provide space therebetween to receive and retain individual of said potatoes. The conveyor retains and discharges the potato in the same distribution as received, said potatoes being individually nested between fingers and discharged free from any bruising which results from potatoes bunching up and rolling en masse on a conveyor.

It is an object of this invention to provide a conveyor arranged and constructed to receive and discharge a root crop such as potatoes in the same distribution as received.

It is another object of this invention to provide a conveyor comprising cross links, said links embodying upstanding rubber fingers integral herewith with the fingers of successive of said links being in a staggered relation with respect to each other.

It is more specifically an object of this invention to provide a conveyor comprising longitudinally spaced interengaging cross links, said links respectively having a rubber coating molded thereon and having integral therewith upstanding rubber fingers spaced therealong, adjacent of said fingers on successive of said links being arranged to be in staggered relation with respect to one another and said having integral with said coating, upstanding shoulder portions adjacent their outer ends.

These and other objects and advantages of the invention will be set forth in the following description made in connection with the accompanying drawings in which the like reference characters refer to similar parts throughout the several views and in which FIG. 1 is a fragmentary view in perspective of a conveyor, FIG. 2 is a broken view in top plan of a portion of a conveyor, FIG. 3 is a broken view in elevation corresponding to FIG. 2, FIG. 4 is a broken view of a conveyor in vertical longitudinal section, and FIG. 5 is a view in vertical section of a detail of structure on an enlarged scale.

DESCRIPTION OF PREFERRED EMBODIMENT

Figures 4, 5:
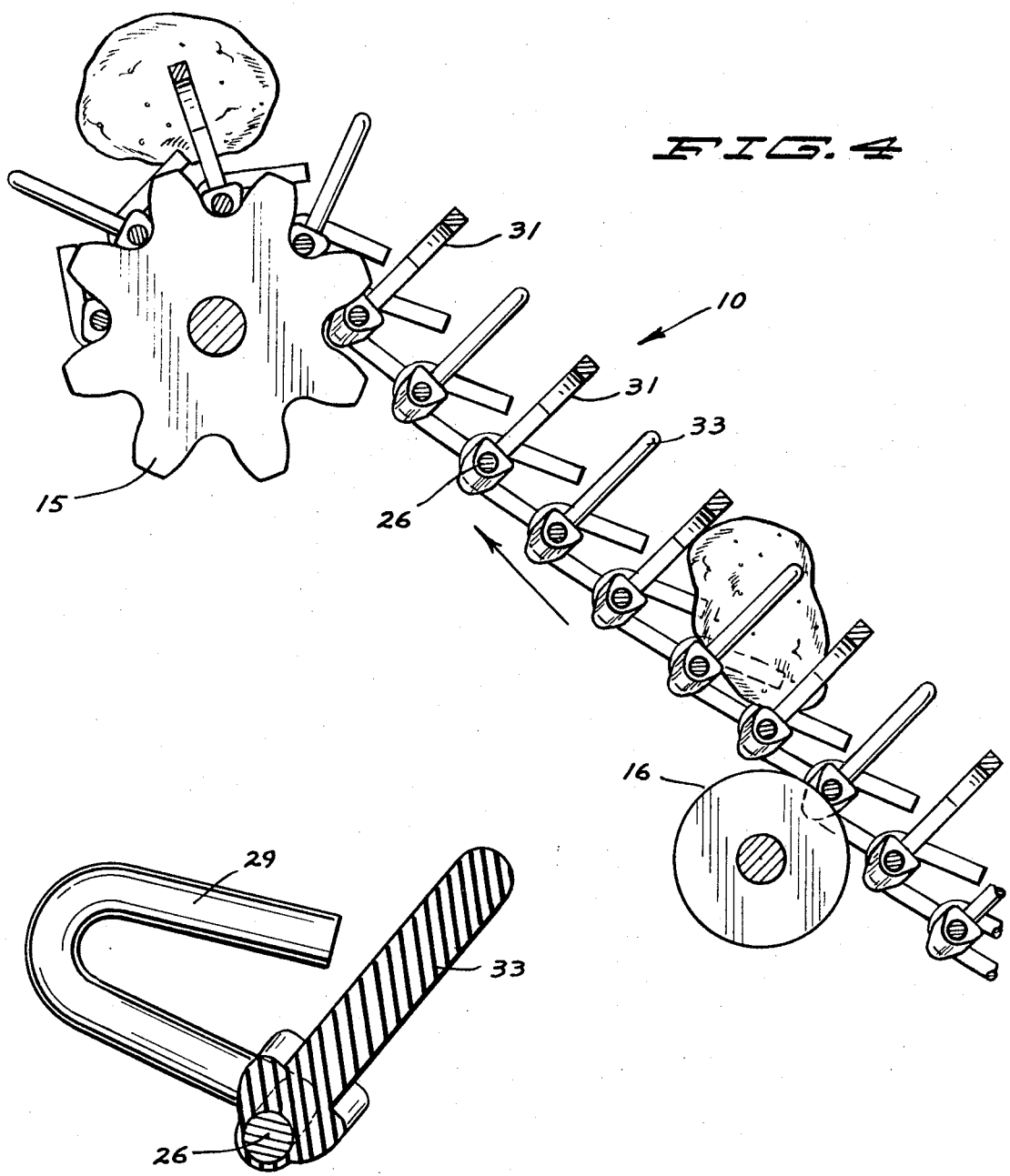

With reference to the FIGS., an endless conveyor 10 is indicated in FIG. 4 and a segment 12 thereof is shown in FIG. 1 in sufficient detail for a full disclosure of the structure comprising the subject matter of the invention herein.

It will be understood that the conveyor 10 will be mounted in a usual manner to pass over sprocket wheels such as sprocket wheel 15 and over individual conventional supports such as the idler roller 16. The conveyor will be operated as in connection with a potato harvester.

Said conveyor is comprised of longitudinally spaced interengaging cross links, representative of which are the link members 20-25 hereinafter referred to as links.

The link 25 will be described in detail. Said link as shown comprises a rod 26 having a lowered central dodged or off-set portion 27 which offset portion has upwardly inclined end portions 28 which end portions as illustrated extend outwardly horizontally to be bent at right angles forwardly and then are upwardly reversely bent to form hook-like terminal portions 29 by means of which one link interengages another as shown.

Said rod 26 has molded thereon a rubber coating 30 extending thereacross but sufficiently short of the terminal ends thereof for said rod to accommodate adjacent said terminal portion 29 by sprocket driving wheels.

Molded at one end of said link integral with said coating is an upstanding outwardly angled retaining member 31 formed here as a shoulder. Also molded integral with said coating spaced along and upstanding from said rod are a plurality of fingers 33. Said fingers are sufficiently resilient or flexible to yield to a potato for the purpose of nesting potatoes between adjacent of said fingers and said fingers will be spaced at such intervals as to prevent potatoes from rolling or moving therebetween. Like portions of other links are indicated by like reference numerals. Said fingers will be of sufficient height to retain said potatoes therebetween.

With reference to FIG. 1 it will be noted that link 24 has its shoulder 31 at its end which is transversely or diagonally opposed to that of the shoulder bearing end of the link 25. This successive of said links have said shoulders disposed at diagonally opposed ends with respect to one another. Said fingers 33 are disposed on said links whereby the fingers of successive of said links are in a staggered or an offset relation with respect to one another.

Said links of sufficient number comprising the conveyor 10 will be interengaged as illustrated in FIG. 1 to form an endless conveyor of desired length.

OPERATION

The conveyor 10 when used as a primary elevating conveyor will receive potatoes as from the crop digging blades. The conveyor will retain the potatoes and stones and clods of dirt thereon in the same distribution in which they are received. Loose dirt and small particles of dirt will fall away through the space between the links. Potatoes, stones and clods of dirt retained on said belt will be nested between adjacent fingers and will be held in separated position throughout the length of travel over the upper run of the conveyor. Means supplementary of said conveyor may be provided for separation of the potatoes from other material, upon their discharge from said conveyor.

The finger equipped conveyor herein thus prevents potatoes from rolling or bunching up and thus prevents bruising of the potatoes which results from contact between potatoes and from contact between potatoes with stones and clods of dirt. Also, potatoes in being held in nested position are prevented from rolling crosswise and off of the conveyor in the situation where the harvester is in operation on side-hill conditions. Further, the nesting of the potatoes maintains them in a distributive condition over the conveyor and thus prevents roll back or bunching up of the potatoes against flights, and thus substantially increases the effective load or carrying capacity of the conveyor. Further, the potatoes in being discharged from the conveyor in spaced relation to one another are more efficiently and expeditiously handled by mechanical separation equipment upon discharge than are potatoes discharged in bunched condition. Potatoes coming onto the conveyor close together are effectively separated by being nested between adjacent sets of fingers and are thus retained immobile until discharged.

Said shoulders are in alignment as carried by alternate of said links and in this relation are spaced sufficiently close together to prevent the passage of of potatoes therebetween. Thus said shoulders form in effect, a cushioned retaining wall at either side of said conveyor.

The structure herein has proved to be very successful in use.

It will, of course, be understood that various changes may be made in the form, details, arrangement and proportions of the parts, without departing from the scope of the invention herein which generally stated, consists in an apparatus capable of carrying out the objects above set forth, in the parts and combination of parts disclosed.

The following are the claims for the continuation application.

What is claimed is:

1. An endless conveyor belt construction having in combination,
    interengaged cross links,
    said links each comprising a rod having a lowered offset central portion, said central portion terminating in upwardly inclined end portions,
    said end portions having portions angled at right angles to said central portion and being reversely curved to form hooks disposed in planes at right angles to the axis of said rod,
    a rubber coating overlying said rod short of the ends thereof, and
    a plurality of rubber fingers spaced along said rod integral with said rubber coating and upstanding therefrom,
    successive of said links having said fingers disposed thereon to be in staggered relation with respect to one another, and
    said fingers being sufficiently resilient to yield to the weight of potatoes and to operate to nest and retain said potatoes therebetween.

2. The structure set forth in claim 1, wherein
    said rod has an upstanding outwardly angled rubber retaining member at one end thereof, said member being integral with said rubber coating, and
    successive of said links respectively having said retaining members at diagonally opposed ends thereof.

3. The structure set forth in claim 1, wherein
    said fingers have height just sufficient to receive and retain potatoes therebetween.

4. The structure set forth in claim 1, wherein
    said links are disposed in spaced relation longitudinally of said conveyor.

5. An endless conveyor belt construction having in combination,
    interengaged cross links,
    each link comprising a transverse rod,
    a rubber coating overlying each of said rods,
    a plurality of rubber fingers spaced along each of said rods integral with said rubber coating and upstanding therefrom,
    successive of said rods having said fingers disposed thereon to be in staggered relation with respect to one another, and
    said fingers being sufficiently resilient to yield to the weight of potatoes to nest and retain said potatoes therebetween.

* * * * *